United States Patent
Kishi

[19]

[11] Patent Number: 6,032,234
[45] Date of Patent: Feb. 29, 2000

[54] CLUSTERED MULTIPROCESSOR SYSTEM HAVING MAIN MEMORY MAPPING SHARED EXPANSION MEMORY ADDRESSES AND THEIR ACCESSIBILITY STATES

[75] Inventor: Takao Kishi, Tokyo, Japan

[73] Assignee: NEC Corporation, Tokyo, Japan

[21] Appl. No.: 08/962,335

[22] Filed: Oct. 31, 1997

[30] Foreign Application Priority Data

Oct. 31, 1996 [JP] Japan ..................................... 8-305827

[51] Int. Cl.⁷ .................................................. G06F 12/02
[52] U.S. Cl. ........................... 711/156; 711/170; 711/221
[58] Field of Search ............................. 711/1, 2, 5, 115, 711/170, 171, 172, 173, 201, 156, 205, 206, 207, 221; 710/13, 101, 102, 103, 104, 8, 10, 17

[56] References Cited

U.S. PATENT DOCUMENTS

| | | | |
|---|---|---|---|
| 3,970,999 | 7/1976 | Elward | 711/2 |
| 4,280,176 | 7/1981 | Tan | 711/5 |
| 4,430,727 | 2/1984 | Moore et al. | 711/115 |
| 4,980,850 | 12/1990 | Morgan | 711/172 |
| 5,175,836 | 12/1992 | Morgan | 711/172 |
| 5,235,687 | 8/1993 | Bacot et al. | 711/165 |
| 5,459,854 | 10/1995 | Sherer et al. | 713/1 |
| 5,485,590 | 1/1996 | Hyatt et al. | 711/115 |
| 5,577,221 | 11/1996 | Liu et al. | 711/100 |
| 5,704,055 | 12/1997 | George et al. | 711/2 |

FOREIGN PATENT DOCUMENTS 6-250915   9/1994   Japan .

OTHER PUBLICATIONS

"PX 7800 Central processing Unit", NEC Technical Report, vol. 48, No. 9, 1995, pp. 28–36.

*Primary Examiner*—B. James Peikari
*Attorney, Agent, or Firm*—Sughrue, Mion, Zinn, Macpeak & Seas, PLLC

[57] ABSTRACT

In a multiprocessor system where a shared expansion memory and a number of loosely coupled clusters are provided, each cluster comprises at least one CPU and a main memory connected to a system bus, and an address memory. During system initialization, a configuration table is created in the main memory, and an expansion memory location is accessed and status of the access is received. If the access status indicates that the access is successful, the address of the memory location is written into the address memory. Otherwise, an inaccessibility indication is stored in the configuration table to prevent the operating system from accessing that expansion memory location. During read/write operation, when an address of the expansion memory is received from the system bus, the address memory is searched for an address corresponding to the received address. If the received address has a corresponding address in the address memeory, data is tranferred between the expansion memory and the system bus. If an error is detected when accessing an expansion memory locatio during the read/write operation, the address of that location is removed from the address memory and the system is restarted for initialization.

6 Claims, 8 Drawing Sheets

CPU SUBROUTINE

DATA TRANSFER FROM MAIN MEMORY TO EXPANSION MEMORY

CPU SUBROUTINE

DATA TRANSFER FROM EXPANSION MEMORY TO MAIN MEMORY

CLUSTERED MULTIPROCESSOR SYSTEM HAVING MAIN MEMORY MAPPING SHARED EXPANSION MEMORY ADDRESSES AND THEIR ACCESSIBILITY STATES

BACKGROUND OF THE INVENTION

1. Field of the Invention

The present invention relates generally to clustered multiprocessor systems, and more particularly to a multiprocessor system having a plurality of loosely coupled clusters sharing an expansion (external) memory.

2. Description of the Related Art

In a clustered multiprocessor system where an expansion memory is shared by a number of clusters to take advantage of its high speed performance and non-volatility, it is the usual practice to install it as an eternal device through an I/O bus of each cluster.

In a general-purpose, main-frame computer system as described in an article "PX 7800 Central Processing Unit", NEC Technical Report, Vol. 48, No. 911995, pages 28–36, an expansion memory adaptor is employed for interconnecting a number of clusters and an expansion memory. The adaptor is responsible for controlling data transfer between the main memory of each cluster and the expansion memory. Data transfer can be performed in one of two ways, the synchronous mode in which data transfer is performed synchronously with a CPU operation and the asynchronous mode in which data transfer is performed independently of the CPU operation. During the synchronous transfer mode, the start timing of the expansion memory adaptor is synchronized with the start of execution of an exclusive instruction from the CPU and the end timing of the transfer is determined during the execution of the instruction. The turnaround time of synchronous data transfer is sufficiently short for operations at software level. However, in the PX7800 system, the communication of an end-of-transfer event from the expansion memory adaptor to the CPU is via an interface designed specifically to the needs of that system. The asynchronous data transfer, on the other hand, involves staring the expansion memory adaptor and interrupting the process that invoked the starting of the adaptor and reporting the end of data transfer asynchronously to the CPU during the time another process is being executed. The CPU that received it must switch to the process that started the data transfer. As a result, the turnaround time of asynchronous data transfer is inappropriately long for software processing.

Japanese Laid-Open Patent Specification Hei-6-250915 describes a clustered multiprocessor system in which an expansion memory is shared among the clusters. An expansion memory adaptor is provided on the expansion memory side and includes a synchronization buffer and a data buffer. The synchronization buffer is used to absorb clock timing differences between the clusters and the expansion memory. The data buffer is used as a temporary storage area of data from the synchronization buffer before it is delivered to the expansion memory or as a temporary storage area for data from the expansion memory before it is forwarded to the synchronization buffer. However, the connection between the expansion memory and the clusters and their operations are not described in this specification.

If an expansion memory is connected to the system bus of each cluster via a transfer circuit, it can serve as a part or an equivalent of the main memory. If the clustered multiprocessor system is connected to a shared disk in a manner similar to UNIX servers, it is necessary to provide functions that are similar to those of the main memory. More specifically, the Operating System must be informed of the amount of the installed expansion memory units and the actually usable areas of the installed expansion memory units.

SUMMARY OF THE INVENTION

It is therefore an object of the present invention to provide a multiprocessor system in which a number of clusters are loosely coupled by a shared expansion memory, the multiprocessor system being capable of supporting high speed data transfer between each cluster and the expansion memory and further capable of ascertaining the accessibility of each expansion memory address before an access thereto is attempted.

The object of the present invention is obtained by mapping addresses of a shared expansion memory within the main memory and creating in the main memory a configuration table tat indicates accessibility of each expansion memory address. The configuration table is updated each time the system is initialized, or restarted after an error is encountered during normal read/write operation.

According to a first aspect of the present invention, there is provided a multiprocessor system comprising an expansion memory and a plurality of loosely coupled clusters. Each cluster comprises at least one central processing unit and a main memory both of which are connected to a system bus. A service processor is operable during system initialization for creating a configuration table in the main memory, the table having a plurality of entries for storing information indicating whether an operating system is accessible to individual addresses of the expansion memory. Each cluster is further provided with an address memory, expansion memory access circuitry for sequentially accessing addresses of the expansion memory during the system initialization and accessing an address of the expansion memory upon request during read/write operation, and diagnosis and memory update circuitry responsive, during the initialization, to status information from the expansion memory for writing an address into the address memory if the status information indicates that an access thereto is successful and updating one of the entries of the configuration table if the status information indicates that the access is not successful so that the updated entry is prevented from being accessed by the operating system. A bus interface receives an address of the expansion memory from the system bus during the read/write operation and makes a search through the address memory for an address corresponding to the received address. Data transfer circuitry is provided for transferring data between the bus interface and the expansion memory when the corresponding address is detected in the address memory.

Preferably, the diagnosis and memory update circuitry is provided for responding, during the read/write operation, to status information from the expansion memory for removing an address from the expansion memory if the status information indicates that an access to the address is unsuccessful. In addition, if the system includes a shared disk, the shared disk is preferable coupled to the system bus of each cluster via an input/output bus.

According to a second aspect, the present invention provides a method for operating a multiprocessor system wherein the system includes an expansion memory and a plurality of loosely coupled clusters, each cluster comprising at least one central processing unit connected to a system bus, a main memory connected to the system bus, and an address memory for storing accessible addresses of the expansion memory. The method comprises the steps of creating, in the main memory during system initialization, a configuration table having a plurality of entries for storing information indicating whether an operating system is accessible to individual addresses of the expansion memory, accessing an address of the expansion memory, during a system initialization and receiving status information from the expansion memory, writing an address into the address memory if the status information indicates that an access thereto is successful and updating one of the entries of the configuration table if the status information indicates that the access is not successful so that the updated entry is prevented from being accessed by the operating system, repeating the address accessing step and the address writing and memory updating step during the initialization, receiving an address of the expansion memory, during read/write operation, from the system bus and making a search through the address memory for an address corresponding to the received address, and performing a data transfer between the expansion memory and the system bus if the received address has a corresponding address in the address memory.

BRIEF DESCRIPTION OF THE DRAWINGS

The present invention will be described in further detail with reference to the accompanying drawings, in which.

DETAILED DESCRIPTION

Figure 1:
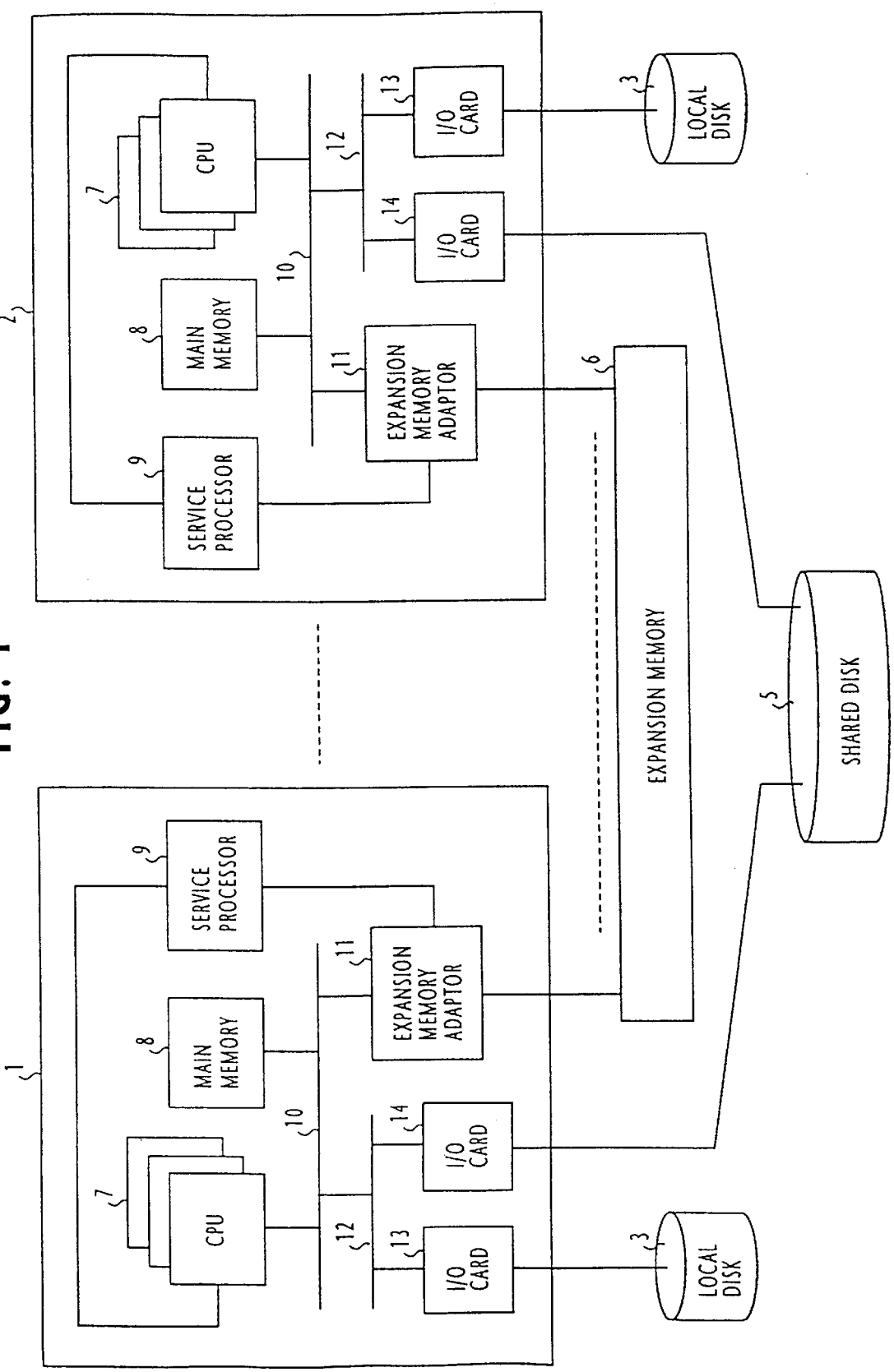
FIG. 1 is a block diagram of a multiprocessor system of the present invention in which a plurality of clusters are loosely coupled.

Referring now to FIG. 1, there is shown a multiprocessor system of the present invention in which a disk 5 and an expansion memory unit (EMU) 6 are shared by a plurality of loosely-coupled clusters of processors, only two clusters 1 and 2 being illustrated for simplicity. As a typical ample, each cluster includes a plurality of central processing units 7, a main memory 8, an expansion memory adapter 11 and an I/O bus 12 to which I/O cards 13 and 14 are attached. When each cluster wishes to access the expansion memory, it is via the expansion memory adaptor 11. Each cluster has a local disk 3 which it accesses through the I/O card 13 and the cluster's access to the shared disk 5 is via I/O card 14.

Note that some of the CPUs are connected to the system bus 10, but others may be simply installed in the cluster and remain unconnected to the system bus until need arises and that more than one I/O bus may be installed in the cluster but remains unconnected to the system bus 10.

Figure 2:
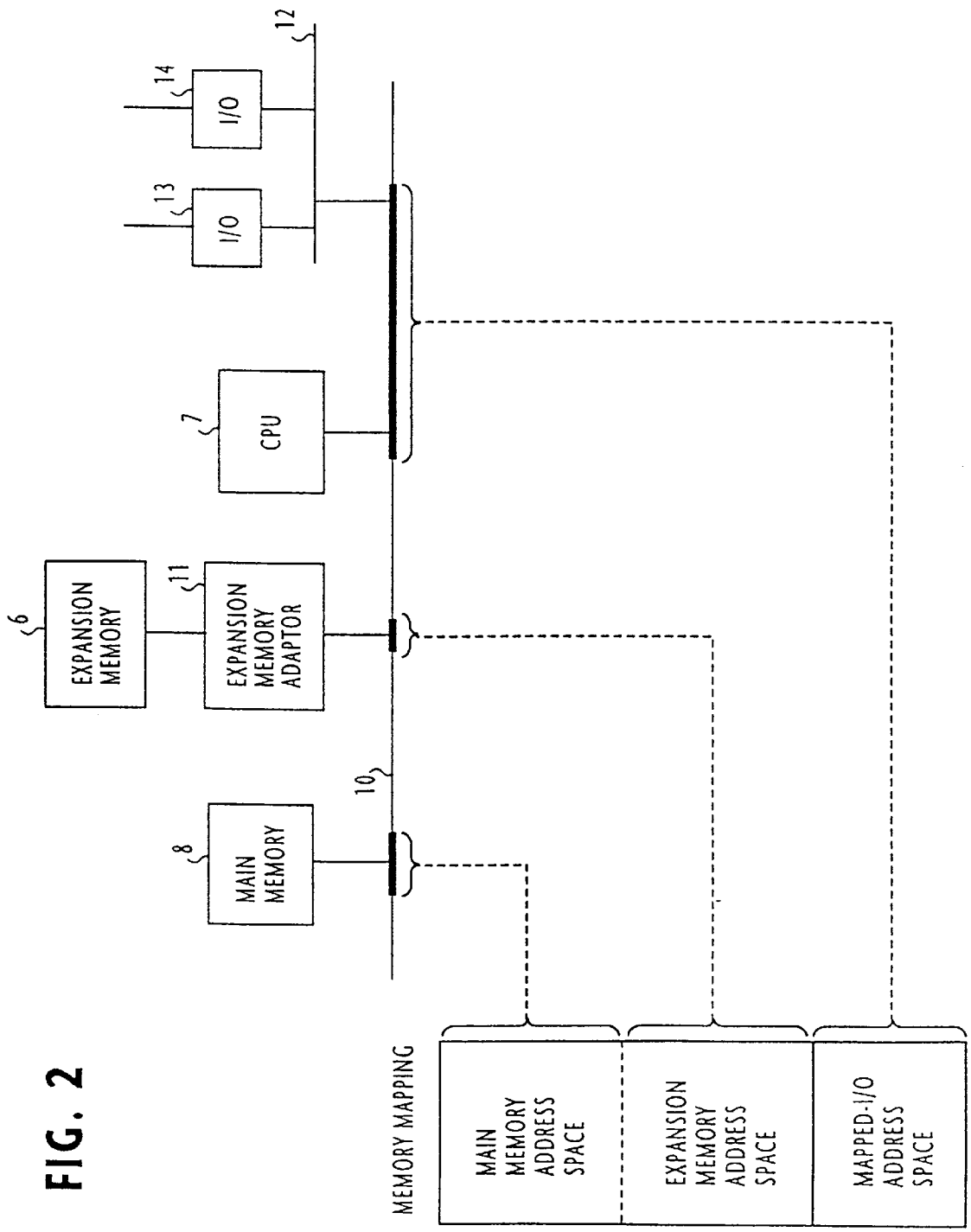
FIG. 2 is a schematic diagram of address mapping of each cluster.

The main memory 8 is connected to a system bus 10 to which the I/O bus 12 is connected. The system bus 10 has a plurality of slots to which main memory addresses, expansion memory addresses and mapped I/O addresses are assigned, as shown in FIG. 2. To the address slots of the main memory 8 ate connected the main memory 8 and the expansion memory adaptor 11, and to the mapped I/O address slots is connected the I/O cards. Therefore, access from a requesting CPU to the expansion memory 6 can be treated in the same manner as its access to the main memory 8.

The main memory 8 comprises a plurality of memory units (MUs) some of which are connected to the system, but others nay remain unconnected to the system bus, and the expansion memory 6 also comprises a plurality of expansion memory units (EUs).

In most cases of the prior a, the address map is divided into a main memory address space and a mapped I/O address space, with the address of the main memory address space corresponding to a physical map address on the main memory space and the mapped I/O address space corresponding to the map address of a slot on the I/O bus 12 or the map address of a CPU slot on the system bus 10.

The present invention can support high speed data transfer between the expansion memory 6 and each cluster (short turnaround time) by creating the map address space of the expansion memory within the main memory 8 of each cluster so that it forms part of the main memory map address space. According to the prior art techniques mentioned earlier, the address space of the expansion memory is created within the I/O address space. Because of the I/O access, the prior art involves a number of software-level tasks such as issuing I/O command, switching processes and terminating I/O process. This results in a heavy software overhead, and hence a long turnaround time.

A service processor 9 is provided in each cluster. In one example, the service processor is coupled to the CPUs 7. When the system is initialized, the service processor 9 is started by an attendant personnel and creates a configuration table 15 within the main memory 8 of each cluster to indicate whether or not the Operating System can use the CPUs, I/O buses, MUs and EUs.

Figure 3:
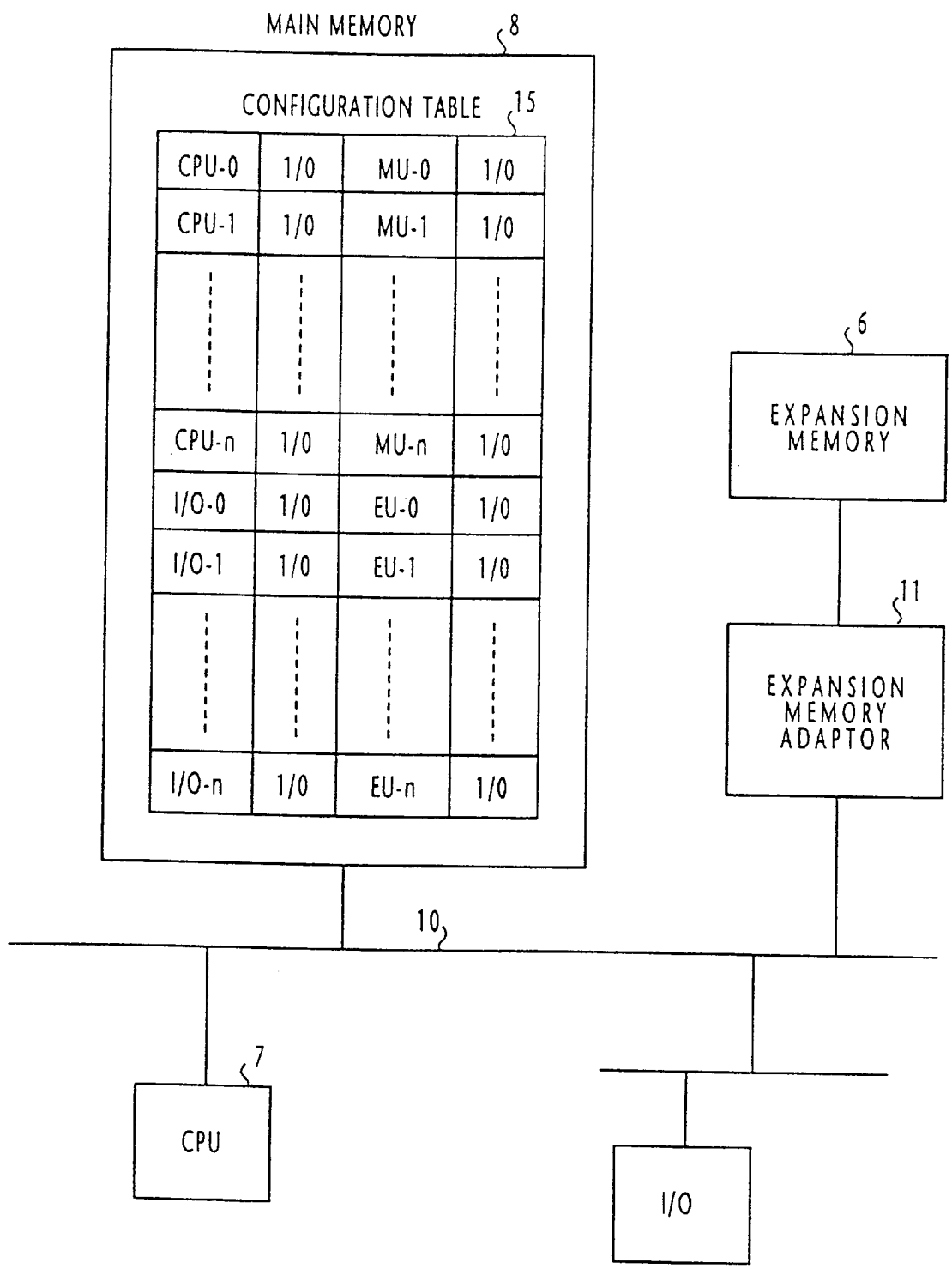
FIG. 3 is a schematic diagram of a configuration table created in the main memory of each cluster.

As shown in FIG. 3, the configuration table stores binary indications of whether the Operating System can use individual entries for CPUs, I/O buses, MUs and EUs. In each of these entries, binary 1 indicates that the OS can use the entry and binary 0 indicates that the OS cannot use that entry.

Figure 4:
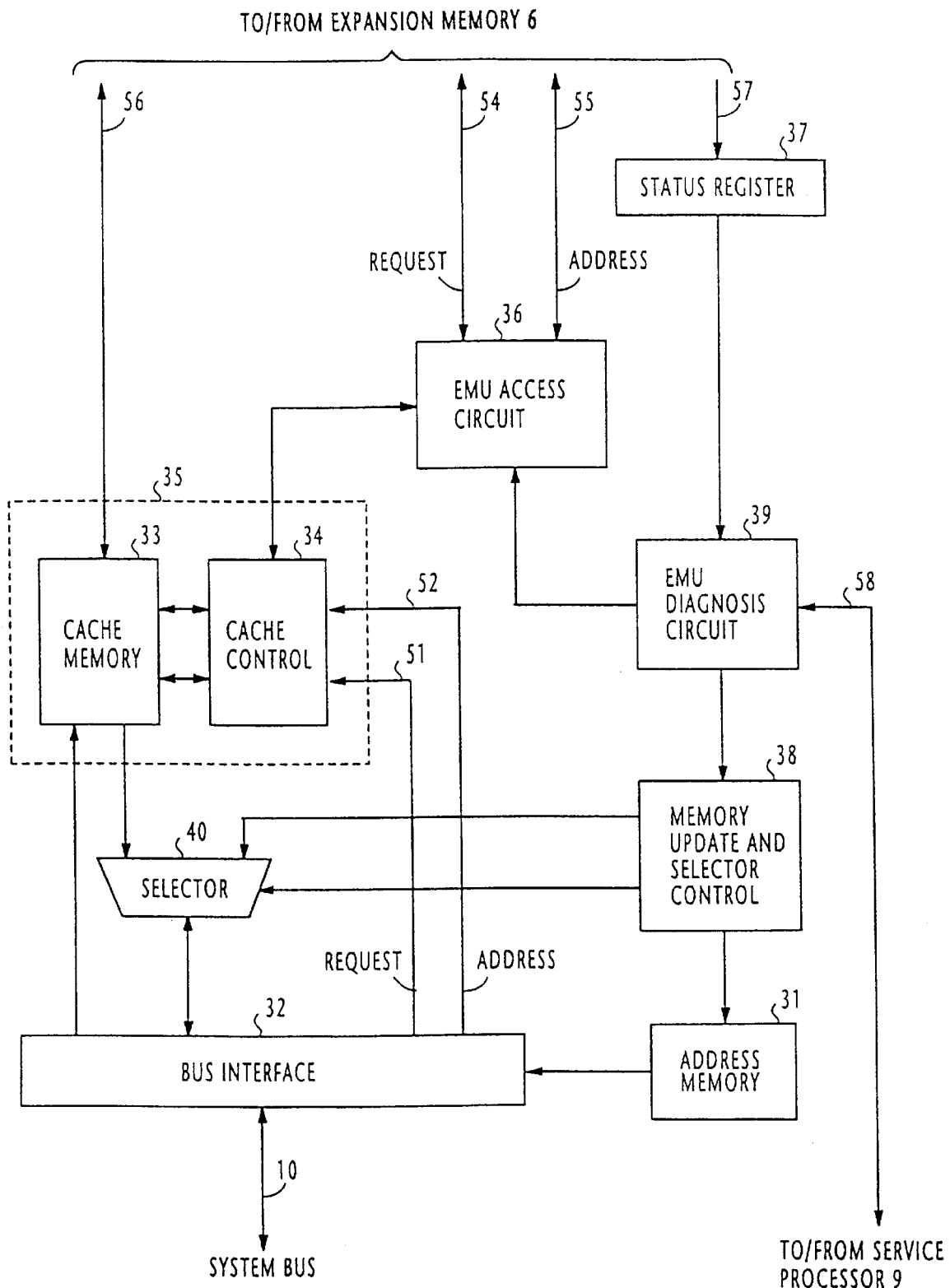
FIG. 4 is a block diagram of an expansion memory adaptor of each cluster.

As shown in detail in FIG. 4, the expansion memory adaptor 11 comprises an address memory 31 and a system bus interface 32 both of which are connected to the system bus 10. An EMU diagnosis circuit 39 and an EMU access circuit 36 are provided.

Briefly described, when the multiprocessor system is initialized, the EMU diagnosis circuit 39 receives an initialize request from the service processor 9 via line 58. In response, the diagnosis circuit 39 begins issuing a series of EMU addresses and a read request to the EMU address circuit 36 in order to access all the expansion memory units (EUs). Note that EMU address corresponds to a number of EUs.

The read request and the EMU addresses are sequentially supplied from the access circuit 36 to the expansion memory 6 via lines 54 and 55. Expansion memory 6 returns status information of each of the addressed memory units to a status register 37 via data line 57. Using the stored status information, the diagnosis circuit 39 determines whether the addressed expansion memory units are usable or not, and results of the diagnosis are supplied to a memory update and selector control (MUSC) circuit 38. If an addressed memory unit is determined to be usable, the address of this memory unit is supplied from the MUSC circuit 38 and stored into the address memory 31. If the addressed memory unit is determined to be unusable, the MUSC circuit 38 supplies a command signal to a selector 40 to select fault indication bits (all zeros) from the MUSC circuit 38 for coupling to the bus interface 32. When all the expansion memory units are tested in this way, the initialization is complete and the EMU diagnosis circuit 39 returns an end-of-initialization signal to the service processor 9 via line 58.

During data transfer operation, the bus interface 32 receives an access request (read or write), a data item (if during write mode) and an address from the system bus 10 and determines whether the address is usable or not by checking the received address with the addresses stored in the address memory 31. If the received address has a corresponding address in the address memory 31, the bus interface 32 supplies the received address request and address to a cache controller 34 via lines 51 and 52 and a data item to a cache memory 33 of the store-through type via line 53. Cache memory 33 and cache controller 34 form a data transfer circuit 35 for performing data transfer between the expansion memory 6 and the system bus 10 via bus interface 32.

During a write mode, cache controller 34 directs the cache memory 33 for storing the data item from the bus interface 32 and forwards it to the expansion memory 6 via line 56. In response to a read request on line 51, the cache controller 34 makes a search through the cache memory for a data item that is associated with the address received by the bus interface 32. If there is none, the controller 34 supplies a read access request to the EMU access circuit 36. If there is one, it reads a corresponding data item from the cache memory and fords it to the system bus 10 via selector 40 and bus interface 32.

A detailed description of the read/write operation of the expansion memory adaptor 11 will be given below with the aid of flowcharts of FIGS. 5A and 5B.

Figure 5A:
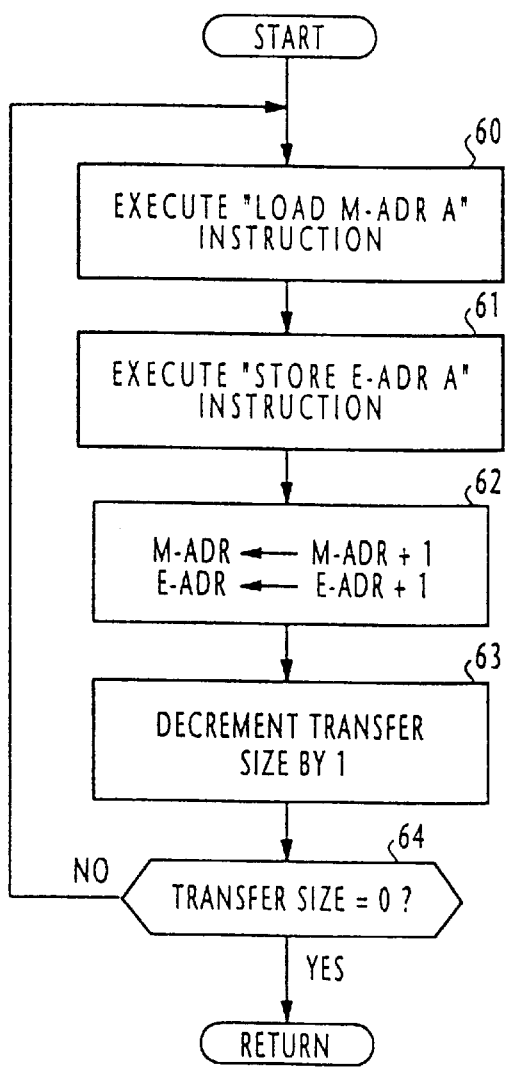
FIG. 5A is a flowchart of the operation of a requesting CPU when performing a data transfer from the main memory to the expansion memory.

When any of the CPUs 7 performs data transfer from the main memory 8 to the expansion memory 6, the subroutine of FIG. 5A is started. At step 60, a LOAD instruction is executed by reading a word from a location of the main memory specified by a read address M-ADR and loaded into the A-register (general register) of the CPU.

At step 61, the requesting CPU 7 issues a write request together with the E-ADR address and the A-register word (STORE instruction) to the system bus 10. More specifically, in the expansion memory adaptor 11, the bus interface 32 makes a search through the address memory 31 for an expansion memory address that corresponds to the address E-ADR. If there is one, the bus interface 32 forwards the write request and the E-ADR address to the cache controller 34 via lines 51 and 52 and the fetched word to the cache memory 33 via line 53. Cache controller 34 forwards the stored word together with the received address to the EMU access circuit 36. According to the write request, the access circuit 36 issues a write instruction to expansion memory 6 via address line 55. In this way, a word stored in the A-register is written into a location of the expansion memory 6 specified by the write address E-ADR. If an error occurs in this write operation, the expansion memory 6 sets fault status information into the status register 37. The operation of the expansion memory adaptor 11 during such an unsuccessful write operation will be described later in detail.

Following the execution of step 61, flow proceeds to step 62 to increment the read address M-ADR and the write address E-ADR by one. At step 63, the size of data transfer is decremented by one and checked with a zero value (step 64). If the transfer size is not equal to zero, flow returns from step 64 to step 60 to repeat the process until it reduces to zero, and the CPU returns from the data transfer subroutine to the main routine. In this way, data of a given size is transferred from the main memory to the expansion memory on a per-word basis.

Figure 5B:
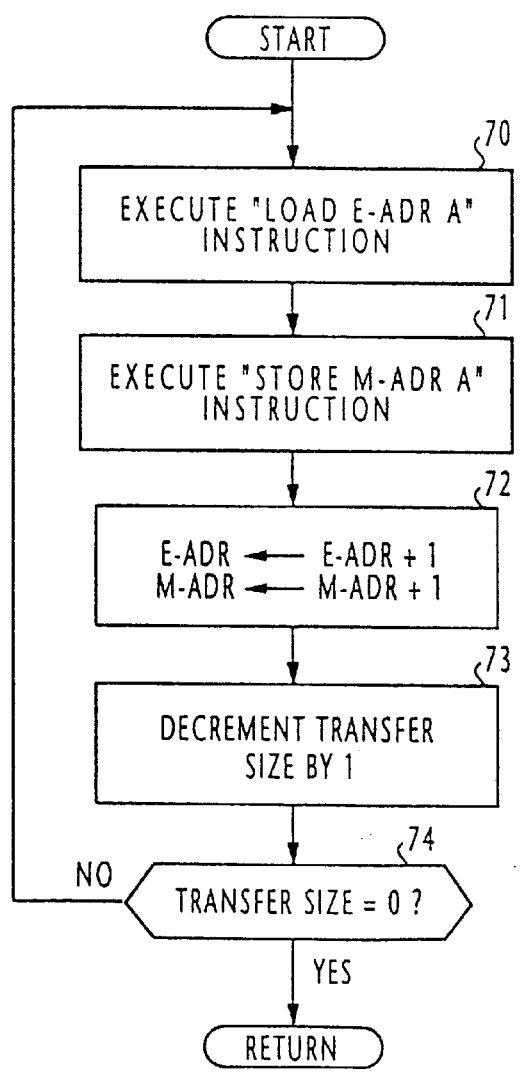
FIG. 5B is a flowchart of the operation of the CPU when performing a data transfer from the expansion memory to the main memory.

When a CPU 7 performs data transfer from the expansion memory 6 to the main memory 8, it invokes the subroutine of FIG. 5B. At step 70, the requesting CPU issues a read request together with an E-ADR address (LOAD instruction) to the system bus 10. In the expansion memory adaptor 11, the bus interface 32 makes a search through the address memory 31 for an expansion memory address that corresponds to the address E-ADR. If there is one, the bus interface 32 forwards the read request and the E-ADR address to the cache controller 34 via lines 51 and 52. Cache controller 34 searches the cache memory 33 for corresponding data. If there is one, controller 34 commands the cache memory to forwards the corresponding data to the bus interface 32. If no corresponding data exists in the cache memory, the cache controller 34 commands the EMU access circuit 36 to issue a read instruction to expansion memory 6 via address line 55. In response, the expansion memory 6 reads a word from the specified location and stores it into the cache memory 33. The stored word is then forwarded through selector 40 and bus interface 32 onto the system bus. The requesting CPU receives the word from the system bus 10 and loads it into its A-register. If an error occurs in this EMU read operation, the expansion memory 6 sets fault status information into the status register 37. If an error occurs in this read operation, the expansion memory 6 sets fault status information into the status register 37. The operation of the expansion memory adaptor 11 during such an unsuccessful read operation will be described later in detail.

Following the execution of step 70, flow proceeds to step 71 to execute a STORE instruction by writing the word stored in the A-register into a location of the main memory 8 specified by a write address M-ADR. At step 72, the read address E-ADR and the write address M-ADR are incremented by one. The size of data transfer is decremented by one (step 73) and checked with a zero value (step 74). If the transfer size is not equal to zero, flow returns from step 74 to step 70 to repeat the process until it reduces to zero, and the CPU returns from the data transfer subroutine to the main routine. In this way, data of a desired size is transferred from the expansion memory to the main memory on a per-word basis.

It is seen therefore that, since each of the EMU read and write operations is performed by calling a subroutine on a synchronous mode, the turnaround time between the main memory and the expansion memory is reduced to a minimum. This enables the expansion memory 6 to be used as a part or an equivalent of the main memory 8.

Figure 6:
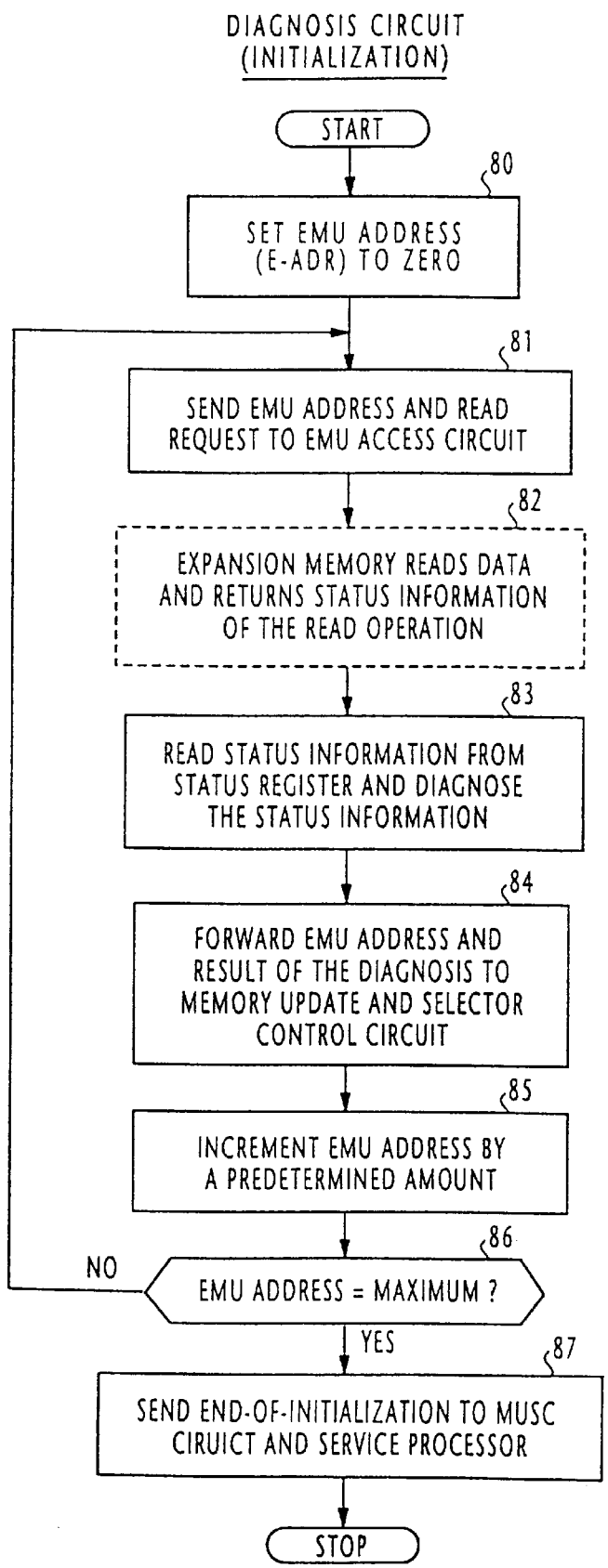
FIG. 6 is a flowchart of the operation of the EMU diagnosis circuit when performing an initialization of the expansion memory adaptor.

FIG. 6 shows, in detail, the operation of the EMU diagnosis circuit 39 when the system is initialized. The initialization process by the EMU diagnosis circuit 39 starts in response to an initialization request from the service processor 9 when the latter is accessed by an attendant personnel. At step 80, the diagnosis circuit 39 sets the initial EMU address E-ADR to zero, and proceeds to step 81 to send a read request and the EMU address to the EMU access circuit 36. Expansion memory 6 responds to the read request by returning status information indicating whether the read operation is successful or nor to the status register 37 (step 82). At step 83, the diagnosis circuit reads out the status information from the status register 37 and diagnoses the status information and forwards the EMU address and the result of the diagnosis to the memory update and selector control (MUSC) circuit 38 (step 84), which performs a memory update and selector control operation as will be described with reference to FIG. 7. Diagnosis circuit 39 increments the EMU address by a predetermined address value which corresponds to a single word, 1024 words or corresponds to a unit value by which a memory module is installed (step 85). Flow proceeds to step 86 to check to see if the E-ADR address is equal to a predetermined maximum value. If so, the diagnosis circuit terminates the initialization process by applying an end-of-initialization signal to the MUSC circuit 38 as well as to the service processor 9 (step 87). Otherwise, flow returns to step 81 to perform a read access to the next EMU address.

Figure 7:
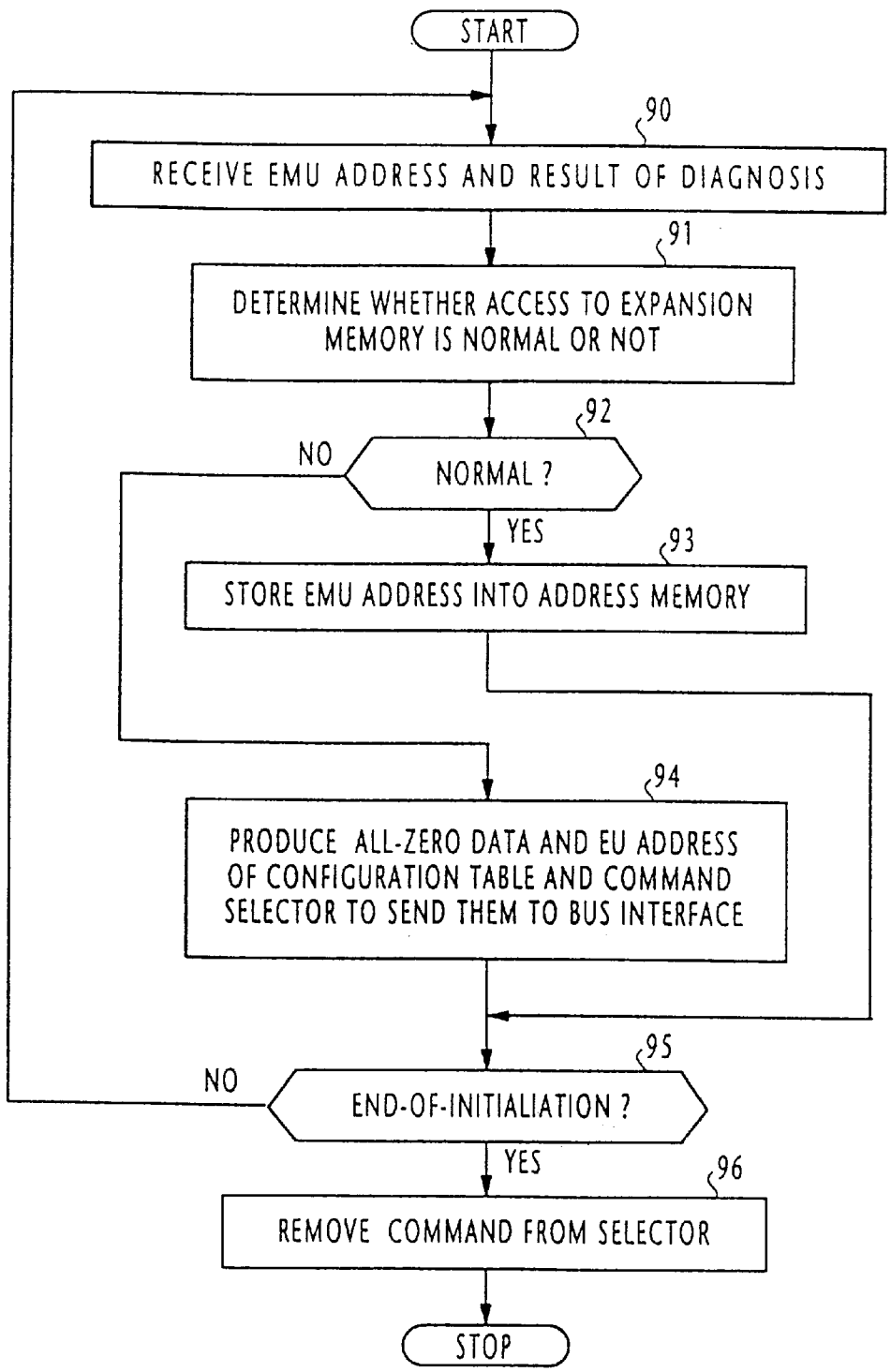
FIG. 7 is a flowchart of the operation of the memory update and selector control (MUSC) circuit during the initialization of the expansion memory adaptor.

The operation of the memory update and selector control (MUSC) circuit 38 will now be described in detail with reference to FIG. 7. When the diagnosis circuit 39 produces the result of a diagnosis, it issues an initialization request to the MUSC circuit 38 together with an EMU address and the status of the address. The operation of the MUSC circuit starts, at step 90, by receiving the EMU address and its status information, and proceeds to step 91 to make a decision on the status information. If the status of the EMU address is normal (step 92), flow proceeds to step 93 to store the EMU address into the address memory 31. If the status of the EMU address is abnormal (step 92), flow proceeds to step 94 to produce all-zero data, an EU address in the configuration table corresponding to the EMU address and a write request, and commands the selector 40 to select and pass these information to the bus interface 32. Therefore, all-zero data will be written into an EU address of the configuration table created in the main memory 8 if access to the corresponding EMU address in the expansion memory fails, and in this case, EMU address registration into the address memory 31 is not performed.

Following step 93 or 94, flow proceeds to decision step 95 to check to see if there is an end-of-initialization signal from diagnosis circuit 39. If there is one, flow proceeds to step 96 to remove the select command from the selector 40, and terminates the initialization process. If an end-of-initialization signal is received, flow returns from step 95 to step 90 to repeat the above process on data of the next EMU address.

Therefore, the Operating System possesses the information on which EMU addresses are accessible or not as well as the information on the amount of memory locations that can be used. Futile accesses to expansion memory 6 which could otherwise lead to a "hung system" can therefore be avoided.

Figure 8:
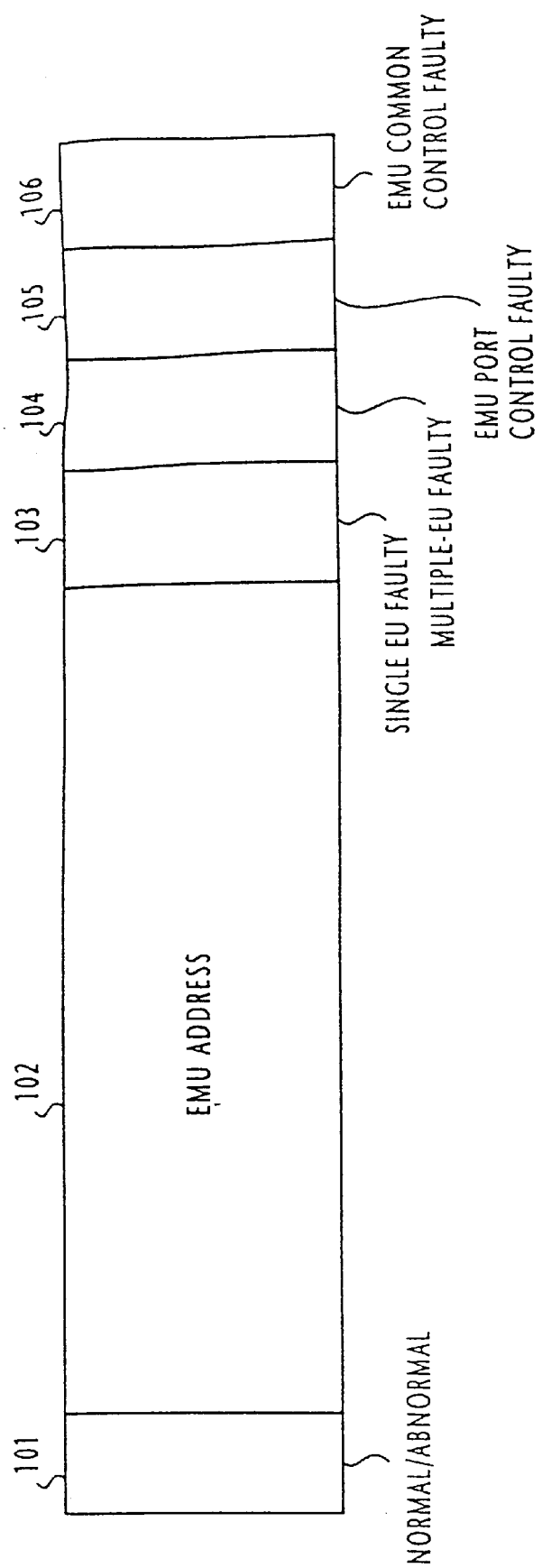
FIG. 8 is an illustration of the structure of status information stored in the status register of the expansion memory adaptor.

FIG. 8 shows in detail the structure of the status information produced by the expansion memory 8 and stored into the status register 37. The status information is composed of status indication fields 101 to 106. A normal/abnormal indication bit is set in the first field 101 and an accessed address of the expansion memory is set in the second field 102, which is followed by the EU fault indication field 103 which indicates that an error has occurred in a single expansion memory unit. Specifically, binary 0 in the first field 101 indicates that an access to the expansion memory 6 is successful and binary 1 indicates that the access is unsuccessful.

When more than one EU is affected by an error, a multi-EU fault indication is set in the field 104. When an error has occurred, the location of the error is identified by the fields 105 and 106. If the error is on the expansion memory side of the connection between the expansion memory and the cluster, an EMU port control fault indication is set in the field 105. If the location of the error is in such a part of the system that affects the expansion memory in its entirety, an EMU common control fault indication is set in the field 106.

The operation of the EMU diagnosis circuit 39 and MUSC circuit 38 during read/write mode proceeds as follows:

When a fault indicating status information of an address of the expansion memory 7 is written into the status register 37 during read/write mode, the diagnosis circuit 39 diagnoses the fault indication and sends the result of the diagnosis and the affected address of the expansion memory to the MUSC circuit 38. In response, the MUSC circuit 38 removes the affected address from the address memory 31. Under tis circumstance, no reply is returned from the expansion memory adaptor 11 to the system bus. Thus, the requesting CPU times out, resulting in a hung system. Attendant personnel, being alerted of the emergency situation, activates the service processor to reboot the system. As a result, the initialization procedure mentioned earlier is performed again, and the configuration table 15 is automatically updated to prevent the affected address of the expansion memory from being accessed again.

Finally, the description is concerned with synchronous data transfer between the shared disk 5 and the expansion memory 6. In the prior art, data transfer between a shared disk and an expansion memory is via a CPU functioning as an intermediary between them, and hence the data transfer is a two-step procedure. In the present invention, since the expansion memory 6 is connected via expansion memory adaptor 11 to the system bus 10, direct transfer of data can be effected between disk 5 and memory 6 via the I/O bus 12. More specifically, the data transfer between the expansion memory 6 and the disk 5 is via I/O control in a manner similar to the data transfer between the main memory 8 and the disk 5. Therefore, process switching is required between an application program, the OS kernel and the I/O driver, and the read/write subroutines of FIGS. 5A and 5B will be called in the process of the I/O driver. In is case, the main memory address M-ADR is translated into the address of the I/O card 14 to which the shared disk 5 is connected.

Since the expansion memory 6 can be used as an equivalent of the main memory 8, it can also be used as a buffer cache between the main memory 8 and the shared disk 5.

What is claimed is:

1. A multiprocessor system, including:
   an expansion memory; and
   a plurality of coupled clusters, each cluster including:
   at least one central processing unit connected to a system bus;
   a main memory connected to a system bus;
   a service processor operable during system initialization for creating a configuration table in said main memory, said configuration table having a plurality of entries for storing information, said plurality of entries indicating whether an individual address of said expansion memory is accessible to an operating system;

an address memory;

expansion memory access circuitry for sequentially accessing addresses of said expansion memory during said system initialization and accessing an address of said expansion memory upon request during read/write operations;

diagnosis and memory update circuitry responsive, during said initialization, to status information from said expansion memory for writing an address into said address memory if the status information indicates that an access thereto is successful and updating one of the entries of said configuration table if said status information indicates that said access is not successful, thereby preventing said operating system from accessing said address;

bus interface circuitry connected to a system bus for receiving an address of said expansion memory from the system bus during said read/write operation and making a search through said address memory for an address corresponding to said received address; and data transfer circuitry for transferring data between said bus interface circuitry and said expansion memory when an address corresponding to the received address is detected in said address memory, said data transfer circuitry further including a cache memory for holding data corresponding to said received address.

2. A multiprocessor system as claimed in claim 1, wherein said diagnosis and memory update circuitry is responsive, during said read/write operation, to status information from said expansion memory for removing an address from the expansion memory if said status information indicates that an access to the address is unsuccessful.

3. A multiprocessor system as claimed in claim 1, wherein said central processing unit executes a first data transfer subroutine during a write mode by loading data from said main memory into a general register of the central processing unit and supplying to the bus interface circuitry the loaded data, a write request and an address of said expansion memory via said system bus, and executes a second data transfer subroutine during a read mode by supplying to said bus interface circuitry a read request and an address of said expansion memory via said system bus and receiving data from the bus interface circuitry via the system bus and loading the received data into the said general register.

4. A multiprocessor system as claimed in claim 1, further including a shared disk, wherein each of said clusters further includes an input/output bus through which said shared disk is connected to the system bus of each of said clusters.

5. In a multiprocessor system including an expansion memory and a plurality of coupled clusters, each cluster including at least one central processing unit connected to a system bus, a main memory connected to said system bus, an address memory for storing addresses of the expansion memory and a data transfer circuit, the data transfer circuit including a cache memory, a method including the steps of:

a) creating, in said main memory during system initialization, a configuration table having a plurality of entries, wherein said configuration table indicates whether an individual address of said expansion memory is accessible to an operating system;

b) accessing an address of said expansion memory and receiving status information from the expansion memory;

c) writing an address into said address memory if the status information indicates that an access thereto is successful and updating one of the entries of said configuration table if said status information indicates that said access is not successful;

d) repeating steps (b) and (c) during said initialization so that information is stored in said configuration table which indicates whether an operating system can access to individual addresses of the expansion memory;

e) receiving an address of said expansion memory, during read/write operation, from the system bus and making a search through the address memory for an address corresponding to the received address; and f) if said received address has a corresponding address in said address memory, performing a data transfer between the expansion memory and the system bus via said data transfer circuit, wherein said cache memory stores data corresponding to said received address.

6. The method as claimed in claim 5, wherein said expansion memory produces a fault indication of an accessed address during said read/write operation, wherein the step (e) further includes the step of removing an address from said address memory according to the fault indication.

* * * * *